United States Patent [19]
Hsieh

[11] Patent Number: 6,075,525
[45] Date of Patent: Jun. 13, 2000

[54] METHOD FOR PREVENTING THE INJURY OF EYESIGHT DURING OPERATING A DEVICE WITH A DISPLAY

[76] Inventor: Kuan-Hong Hsieh, 5FL, No. 98-3, Kuang Fu S Rd., Taipei, Taiwan

[21] Appl. No.: 09/126,660

[22] Filed: Jul. 31, 1998

[30] Foreign Application Priority Data

May 5, 1998 [TW] Taiwan ................................ 87107586

[51] Int. Cl.⁷ ...................................................... G06F 3/00
[52] U.S. Cl. ......................... 345/326; 345/121; 345/339; 345/961; 345/347
[58] Field of Search ................................. 345/112, 121, 345/125, 127, 129, 130, 326, 339, 347, 961, 975; 351/203

[56] References Cited

U.S. PATENT DOCUMENTS

| | | | |
|---|---|---|---|
| 5,040,888 | 8/1991 | Bonhom | 351/203 |
| 5,051,931 | 9/1991 | Cheu et al. | 600/558 |
| 5,173,724 | 12/1992 | Bomham et al. | 351/203 |
| 5,263,678 | 11/1993 | Birkbeck | 248/657 |
| 5,384,593 | 1/1995 | Gell, Jr. et al. | 345/112 |
| 5,888,173 | 3/1999 | Singhal | 482/8 |
| 5,933,130 | 8/1999 | Wagner | 345/112 |

*Primary Examiner*—Raymond J. Bayerl
*Assistant Examiner*—Chi Jackson
*Attorney, Agent, or Firm*—Pollock, Vande Sande & Amernick

[57] ABSTRACT

The present invention is related to a method for preventing the eye injury when a user is operating a device, such as a computer, with a display. When a user operates a computer, the operating time will be accumulated. When the accumulating time reaches the preset value of a first interval (T1), an icon will show on the monitor screen for prompting the operator to blink eyes to moisten the eyeballs. When the accumulating time reaches a second interval (T2), a menu will show on the display screen. If the user chooses to execute the menu, the menu will generate various moving pattern(s) to direct the user's eyes moving upwards, downwards, leftwards and rightwards, and zooming in and out gradually. The illumination or size of said moving pattern(s) can be changed simultaneously.

11 Claims, 4 Drawing Sheets

METHOD FOR PREVENTING THE INJURY OF EYESIGHT DURING OPERATING A DEVICE WITH A DISPLAY

BACKGROUND OF THE INVENTION

1. Field of the Invention

The present invention is related to a method for preventing the eye of user from injury, specially for protecting a user during using a display device, such as a computer monitor or the like.

2. References on Related Art

There are three types of well-known vocational injuries for computer operators or users. First injury is caused by the radiation from the computer display, and the radiation will be accumulated continuously within the human body. The second one is the injury of wrists and shoulders caused by the long period of time of using a keyboard or a mouse. However, the injury of wrists and shoulders can be prevented better than eyes because that users will feel the tiredness of wrists or shoulders since there are lots of nerves around wrists or shoulders.

The third one is the eye injury which is not easily to be felt by a user, since the number of nerves around eye is much less than those which wrists and shoulders. Besides, the user has to pay a lot of attention watching a computer monitor to read the information thereon, especially while information changes very quick. Furthermore, because the distance between eyes and the monitor is almost fixed, the eye focus is fixed accordingly, and the eye sight may be damaged.

As shown in FIG. 1, the structure of a eye, for rotating an eyeball to watch different directions which includes the medial oblique 41, superior oblique 42, superior rectus 43, inferior rectus 44, and medial rectus 45. In addition, the ciliary muscle 46 and suspensory ligaments 48 is used to change the curve of a lens 47 to achieve the focusing function. The iris 49 is located outside the lens 47, which is like an active curtain to adjust the incoming light. The eyelid 50 is on the outermost of eye not only has the function of protecting eyes, but also can moisten eye through blinking the eyelid.

As mentioned above structure of the eyes, all the physiological structure of eyes are almost substantially suspended when the user is watching the computer screen for a long time. It is just like a hand is lifted and suspended on the same position for a long time so that the muscle will easily get injury. As mentioned above, the users are hard to aware earlier that their eyes should take a rest since the number of nerves is very few within eye muscles. Accordingly, when the users get headache or feel their eyes are tired, the damages of eyes have actually been happened already. Therefore, the level of eyes' problem will be increased without precaution.

The device for curing the inflammation, such as U.S. Pat. No. 5,691,800, can not be used to prevent eye injury in advance like the present invention.

SUMMARY OF THE INVENTION

Accordingly, the object of the present invention is to provide a method for preventing the eye injury during using a computer or the like with a display device.

A further object of the present invention is to provide a method by which the operator of a computer may sufficiently relax or exercise the muscles of his or her eyes according to a pre-scheduled time period.

In the method of the present invention, when a user operates a computer, the operating time will be accumulated. When the accumulating time reaches the preset value of a first interval (T1), an icon will show on the monitor for prompting the operator to blink in order to moisten the eyeballs. When the accumulating time reaches a second interval (T2), a menu will show on the monitor. If the user chooses to execute the menu, various patterns will be generated to direct the user's eyes moving upwards, downwards, leftwards and rightwards and zooming in and out. Furthermore, by changing the brightness of patterns the iris can be forced to expand or shrink accordingly.

The patterns can be any design, such as the default desktop patterns shown on the display. The position, size and the brightness of patterns are changeable. In addition, some target pictures can be posted outside of and near the display. The patterns can move toward the one of target pictures from which the user's eyes are able to track the pattern for a longer distance to increase the stretch of eye muscle.

DETAILED DESCRIPTION OF THE PREFERRED EMBODIMENT

Figure 1:
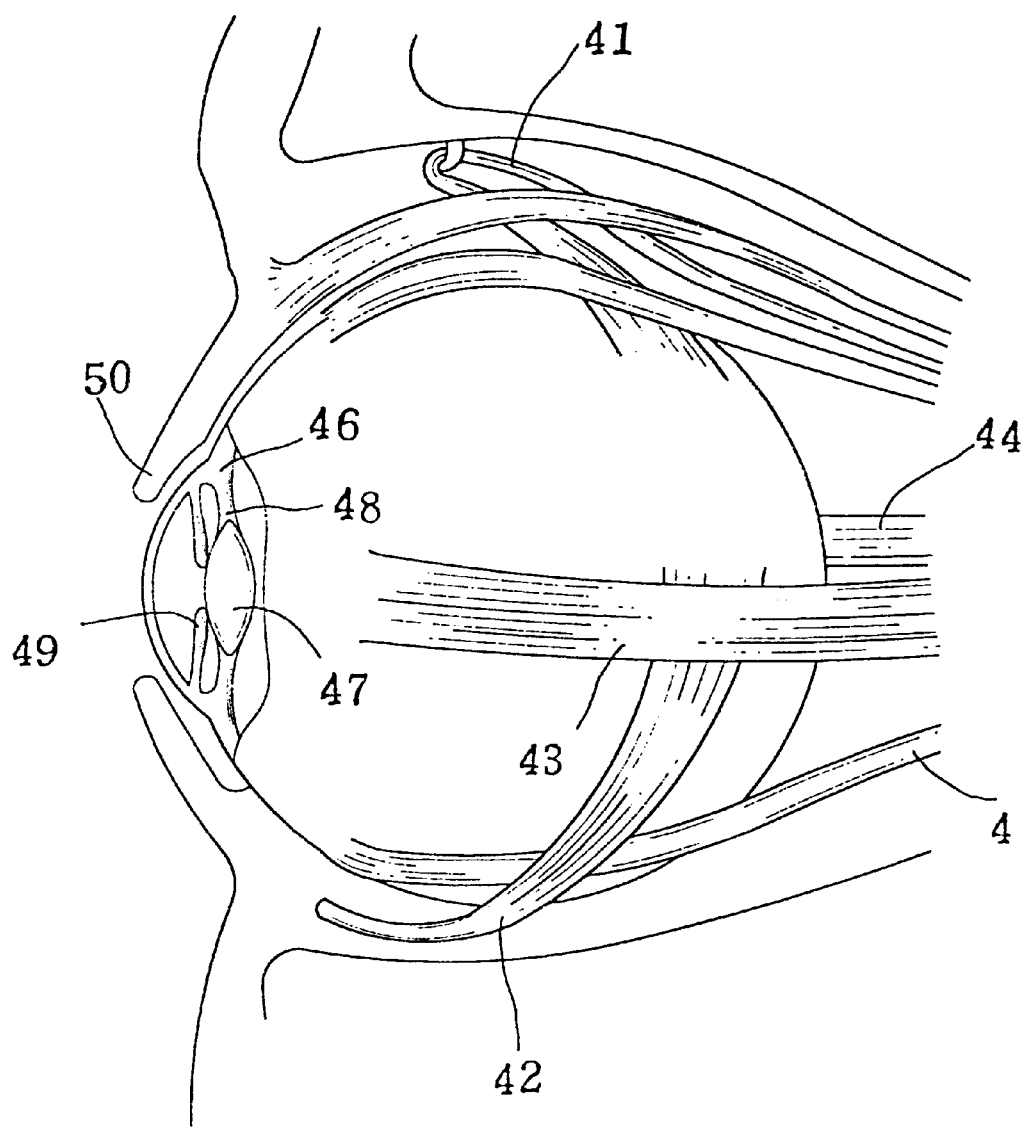
FIG. 1 shows the physiological structure of a human eye.
Figure 2:
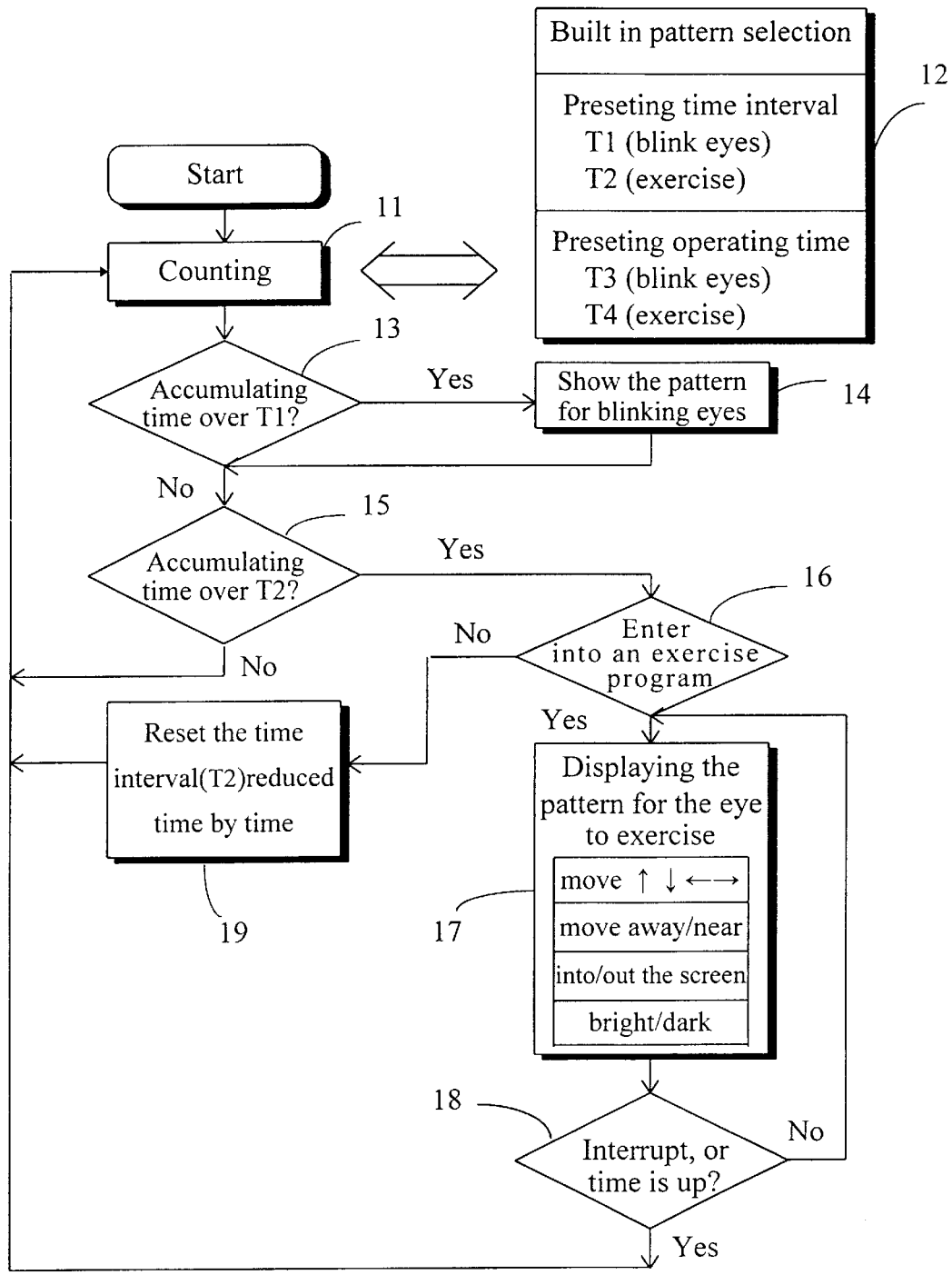
FIG. 2 shows the flow chart of the embodiment of the present invention.

As shown in FIG. 2, the suggested method of the present invention includes the following steps:

(A) accumulating the period of time of operating a computer (block 11), then comparing (block 12) the first interval (T1) and the second interval (T2).

(B) When the accumulating time has reached the preset value of the first interval (T1), an icon built in the program in advance (block 13), such as blinking eyes, will be prompted on the display (1) for a interval (T3) to remind the computer user to blink eyes (block 14). The interval (T3) is preset in the program in advance (block 13).

(C) When the accumulating time has reached the preset value of the second interval (T2) (block 15), a menu will be prompted on the display (1) for the user to choose whether he or she will like to enter an exercising program (block 16) for the eyes.

(D) If the user would like to enter the exercising program, then pattern(s) will show on the display (1) assisting the user to exercise his or her eyes (block 17). A moving pattern(s) will be generated to direct the user's eyes moving upwards, downwards, leftwards, rightwards and zooming in and out. The brightness of pattern(s) or the display (1) can also be changed from time to time. The exercising program will be terminated (block 18) when the user stop it, or the exercising program has be running out a interval (T4). The interval (T4) is also preset in the program in advance (block 13). After the exercising program is terminated, the process goes back to the step (A) and the accumulating time will be reset.

(E) If the user does not select to execute the exercising program, then the preset value of the second interval (T2) is reset and value is decreased gradually (block 19). Then, the process goes back to the step (A).

During the step (E), if the user did not select the exercising program for the purpose of relaxing eyes, the second interval (T2) will be shortened. Each of the reduction of time can be a fix interval or a variable interval. The calculation for the time reduction can be also depended on how many times of "not selecting exercising program". Once the user choose enter the exercising program, the second interval (T2) will be initialized as the default value.

The counting method of the present invention is different from those very popular program, "screen saver." The "screen saver" program will be executed (e.g. the screen becomes dark) when the computer is "not" operated (e.g. no typing action, no mouse action) for a period of time. Reversely, the counting method of the present invention calculates the operating time (e.g., the screen is not on the "screen saver" mode.) Furthermore, the purpose is also different. The "screen saver" program is designed for protecting and decorating the screen. However, the present invention is designed for directing the movement of user's eyes so that the eye injury can be prevented.

Figure 3:
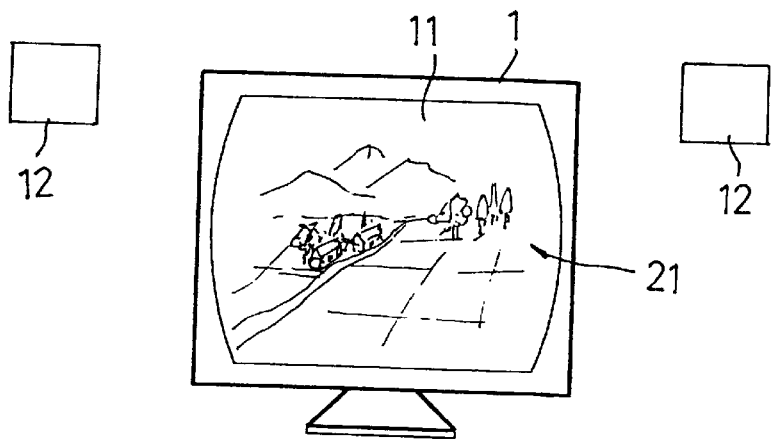
FIGS. 3 to 6 are the schematic view for various simulating patterns of the present invention.

In order to lead the eyeballs to exercise continuously and to increase the exercises of eyes, it is preferably that the moving patterns can lead the user's eyes moving from the inside area of the screen (11) to outside area of the screen (11) and vice versa. As shown in FIG. 3, some target pictures (12) are posted near outside of the display (1). For example (not shown in Figures), an eagle chases after a running rabbit, and the rabbit run away and toward a rabbit picture which is post outside of the display (1). The rabbit leads the user's eyes moving from the inside to the outside area of the screen (11). When the eagle has left, then the rabbit returns to the screen (11) so as to lead the user's eyes moving from the outside back to the inside area of the screen (11).

Figure 4:
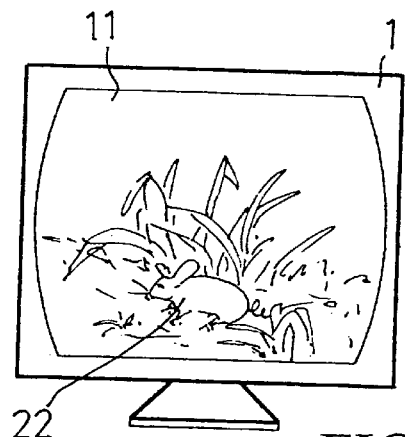
Figure 5:
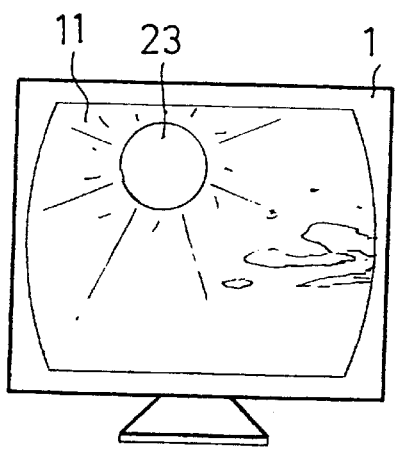
Figure 6:
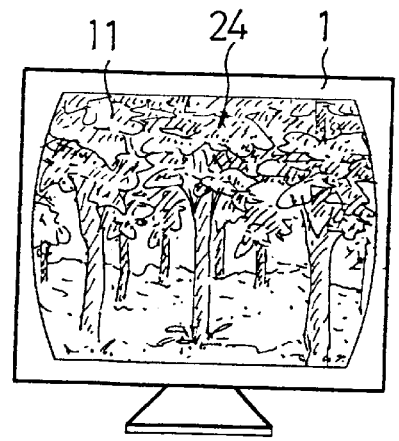
Figure 7:
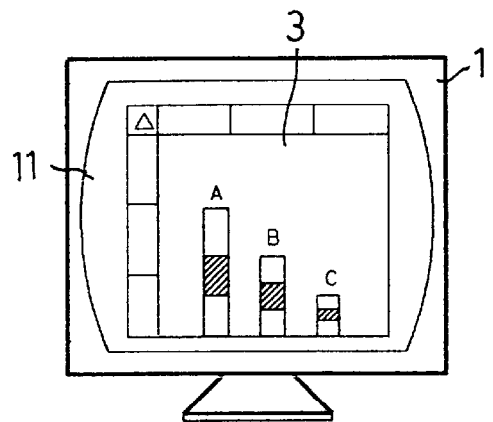
FIGS. 7 to 12 are the schematic view for another various simulating patterns of the present invention.

A more interesting embodiment is that the screen area may simulate the vision of eagle's or shark's eyes during an eagle or shark is flying or swimming. This simulation vision can be achieved by a computer program. As shown in FIG. 3, the vision may show an eagle which is flying at high position and overlooks downward (21). Or the eagle is flying toward an object, such as a mouse (22) as shown in FIG. 4, a sun (23) as shown in FIG. 5, dark region of a forest (24) as shown in FIG. 6, or other simulated environments and objects. Meanwhile, some background music may be added simultaneously so that the user of a computer may relax his or her mind and body temporarily.

Figure 8:
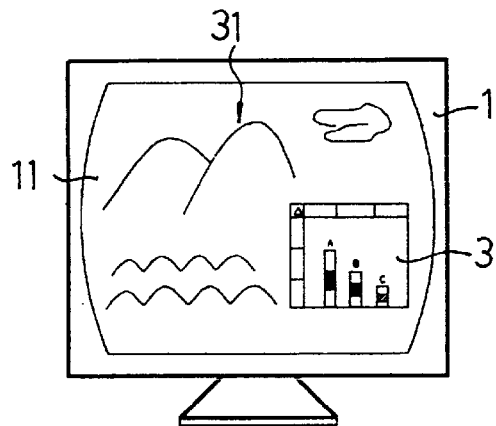
Figure 9:
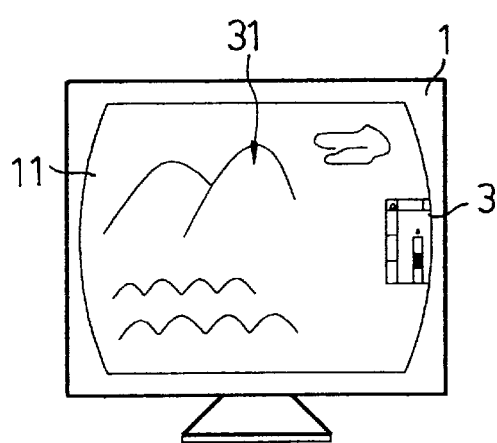
Figure 10:
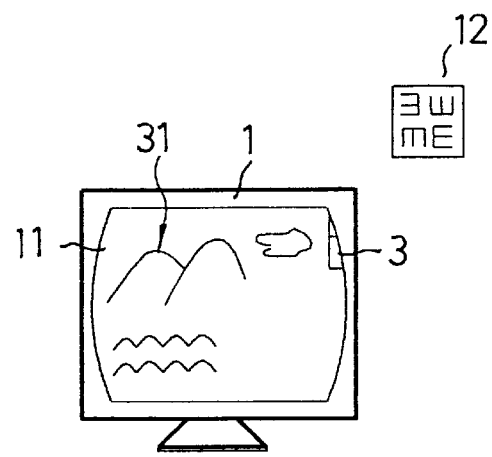
Figure 11:
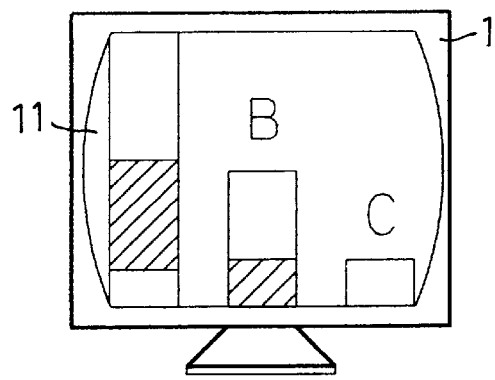
Figure 12:
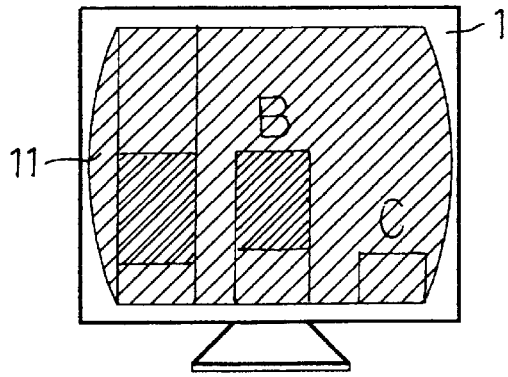

Please refer to FIGS. 7 to 12 for another embodiment of the present invention. A desktop pattern (3), as shown on FIG. 7, originally displays all over the screen (11). After the user selects to get into a mode of relaxing the eyes, the desktop pattern (3) will be zoomed out gradually to a background pattern (31) such as a natural scenery (3), as shown in FIGS. 8, 9, and 10. Finally the working pattern will move away from the screen (11). As shown in FIG. 10, a target picture (12), which is designed for checking the eyesight, is posted (e.g. posted on a wall) around the disappearance point of the desktop pattern (3). On the other hand, the desktop pattern (3) may also be designed to zoom in gradually (not like the window screen of a computer which is amplified at once), as shown in FIG. 11. In addition, the brightness of the desktop pattern (3) can become dim or very bright to the iris of users to expand or shrink accordingly.

By using the present invention, the user may fully relax the eyes, including the change of focus and iris to prevent the eyes from injury.

Although certain preferred embodiment of the present invention has been shown and described in detail, it should be understood that various changes and modification may be made therein without departing from the scope of the appended claims. The present invention can be applied in any device with a display, such as an entertainment system or an internet device with a TV or a monitor.

What is claimed is:

1. A method for preventing the eyes of a user from injury during operating a device with a display including following steps:

(O) presetting a value of a second interval (T2);

(A) accumulating the operating time of said device;

(C) if the accumulating time has reached the value of the second interval (T2), a menu showing on said display to remind user to relax eyes, if the user chooses to relax eyes from the second pattern, executing step (D), otherwise, executing step (E);

(D) displaying a moving pattern(s) which can relax user's eyes, after said moving pattern being terminated, the process returns to said step (A); and (E) decreasing the value of the second interval (T2) and returning to said step (A).

2. The method as recited in claim 1, wherein the calculation for the reduction of said value of the second interval (T2) is dependent on the previous accumulated number of step (E) having been processed, and said value of the second interval (T2) being initialized as said default value of said step (O) when said step (D) is executed.

3. The method as recited in claim 1, wherein in said step (D), the movement of said moving pattern(s) includes moving upwards, downwards, leftwards or rightwards, or zooming in or out gradually.

4. The method as recited in claim 3, the illumination of said moving pattern(s) can be changed.

5. The method as recited in claim 3, the size of said moving pattern(s) can be changed.

6. The method as recited in claim 3, wherein said moving pattern(s) can leave away from said screen or enter into said screen.

7. The method as recited in claim 6, a target picture is posted near outside of said display, said moving pattern(s) can move toward to said target picture and leave away from said screen, or said moving pattern(s) can enter into said screen with a track from said target picture.

8. The method as recited in claim 1, wherein in said step (D), said moving pattern(s) is a desktop pattern, said desktop pattern can be zoomed out gradually to another background pattern and zoomed in gradually.

9. The method as recited in claim 8, the illumination of said moving pattern(s) can be changed.

10. The method as recited in claim 7, said target picture is designed for checking the eyesight.

11. The method as recited in claim 1, further includes a step (B) and wherein said step (O) further presets a value of a first interval (T1), so that if the accumulating time has reached said value of the first interval (T1), an icon showing on the screen of said display to remind user blinking eyes.

\* \* \* \* \*